(12) United States Patent
Alber

(10) Patent No.: US 10,486,806 B2
(45) Date of Patent: Nov. 26, 2019

(54) PIVOT SYSTEMS FOR TILTWING AIRCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 365 days.

(21) Appl. No.: 15/274,040

(22) Filed: Sep. 23, 2016

(65) Prior Publication Data

US 2018/0086446 A1    Mar. 29, 2018

Related U.S. Application Data

(60) Provisional application No. 62/237,241, filed on Oct. 5, 2015.

(51) Int. Cl.
| | |
|---|---|
| *B64C 29/00* | (2006.01) |
| *B64C 3/38* | (2006.01) |
| *B64C 5/02* | (2006.01) |
| *B64C 39/04* | (2006.01) |
| *B64D 35/08* | (2006.01) |

(52) U.S. Cl.
CPC .......... *B64C 29/0033* (2013.01); *B64C 3/385* (2013.01); *B64C 5/02* (2013.01); *B64C 39/04* (2013.01); *B64D 35/08* (2013.01)

(58) Field of Classification Search
CPC ........ B64C 3/385; B64C 29/0033; B64C 5/16
See application file for complete search history.

(56) References Cited

U.S. PATENT DOCUMENTS

| | | | | |
|---|---|---|---|---|
| 1,806,927 A | * | 5/1931 | Aldrich ................... | B64C 3/385 244/48 |
| 2,143,317 A | * | 1/1939 | Horlacher ........... | B64C 29/0033 244/48 |
| 2,421,694 A | * | 6/1947 | Hawkins ................. | B64C 21/02 244/45 A |
| 2,621,001 A | * | 12/1952 | Roman ............... | B64C 29/0033 244/12.4 |
| 2,708,081 A | * | 5/1955 | Dobson ............... | B64C 29/0033 244/7 C |
| 2,961,189 A | * | 11/1960 | Doak ................... | B64C 29/0033 244/12.4 |
| 3,028,123 A | * | 4/1962 | Sorenson ............ | B64C 29/0033 244/48 |
| 3,029,043 A | * | 4/1962 | Churchill ................ | B64C 3/385 244/39 |
| 3,501,248 A | * | 3/1970 | Brocker ................ | B64C 11/003 416/89 |

(Continued)

*Primary Examiner* — Joseph W Sanderson
(74) *Attorney, Agent, or Firm* — Cantor Colburn LLP

(57) ABSTRACT

A tiltwing aircraft includes a fuselage, an engine mounted stationary relative to the fuselage, and an opposed pair of wings. The wings are separated from each other with the fuselage therebetween, each wing independently mounted to the fuselage by a respective pivot system for rotation relative to the fuselage. An opposed pair of rotor assemblies is included, each operatively connected to a respective one of the wings for common rotation with the respective wing back and forth between a first position predominantly for lift to a second position predominantly for thrust.

4 Claims, 5 Drawing Sheets

(56) References Cited

U.S. PATENT DOCUMENTS

| | | | | |
|---|---|---|---|---|
| 5,395,073 | A * | 3/1995 | Rutan | B64C 3/385 |
| | | | | 244/38 |
| 5,839,691 | A | 11/1998 | Lariviere | |
| 6,367,736 | B1 | 4/2002 | Pancotti | |
| 6,698,688 | B1 * | 3/2004 | Jones | B64C 1/26 |
| | | | | 244/99.3 |
| 6,843,450 | B2 * | 1/2005 | Bath | B64C 1/26 |
| | | | | 244/131 |
| 7,131,611 | B2 * | 11/2006 | Ferman | B64C 3/385 |
| | | | | 244/39 |
| 7,871,033 | B2 * | 1/2011 | Karem | B64C 27/08 |
| | | | | 244/17.23 |
| 7,913,947 | B2 * | 3/2011 | Haynes | B64C 29/0033 |
| | | | | 244/12.4 |
| 8,016,226 | B1 | 9/2011 | Wood | |
| 8,322,647 | B2 | 12/2012 | Amraly et al. | |
| 8,342,441 | B2 | 1/2013 | Yoeli | |
| 9,834,303 | B2 * | 12/2017 | Bockmiller | B64C 27/22 |
| 2004/0079839 | A1 * | 4/2004 | Bath | B64C 1/26 |
| | | | | 244/131 |
| 2007/0241228 | A1 * | 10/2007 | Haynes | B64C 29/0033 |
| | | | | 244/7 A |
| 2014/0263854 | A1 | 9/2014 | Ross et al. | |
| 2015/0048214 | A1 * | 2/2015 | Bockmiller | B64C 27/22 |
| | | | | 29/889.1 |

\* cited by examiner

PIVOT SYSTEMS FOR TILTWING AIRCRAFT

CROSS-REFERENCE TO RELATED APPLICATION

This application claims the benefit of priority under 35 U.S.C. § 119(e) to U.S. Provisional Application No. 62/237,241, filed Oct. 5, 2015, which is incorporated herein by reference in its entirety.

BACKGROUND OF THE INVENTION

1. Field of the Invention

The present disclosure relates to aircraft, and more particularly to tiltwing aircraft such as used in in vertical and/or short take-off and landing (V/STOL) applications.

2. Description of Related Art

Tiltrotor aircraft, such as the Bell-Boeing V-22 Osprey, include rotors which can be rotated from a vertical orientation for hovering to a horizontal orientation for forward flight. Similarly, tiltwing aircraft such as the Canadair CL-84 Dynavert include wings with rotors mounted thereto where the entire wing with engines and rotors rotates between the vertical and horizontal positions. Tiltrotor aircraft have an advantage over tiltwing aircraft in that the angle of attack of the stationary wing is advantageous when hovering in a cross-wind. Tiltwing aircraft have an advantage over tiltrotor aircraft in that having the wing always aligned with the rotors improves hover efficiency, whereas tiltrotor aircraft loose rotor efficiency in hover due to the prop wash being incident on the broad side of the wings. Both tiltwing and tiltrotor aircraft enjoy speed and range advantages over conventional helicopters, and still provide for hovering as well as vertical and/or short take-off and landing. Traditional tiltwing aircraft have a single wing member attached to the fuselage, wherein the wing member is hinged to the fuselage so the entire wing member, engines, and rotor assemblies rotate together relative to the fuselage to transition between forward flight and hover or V/STOL.

Such conventional methods and systems have generally been considered satisfactory for their intended purpose. However, there is still a need in the art for improved tiltwing aircraft. The present disclosure provides a solution for this need.

SUMMARY OF THE INVENTION

A pivot system for a tiltwing aircraft includes a support shaft defining a wing tilt axis. A bearing is mounted to the support shaft outboard of the support shaft about the wing tilt axis. A support fitting mounted to the bearing radially outboard of the support shaft for rotation relative to the support shaft about the wing tilt axis.

The bearing can include an axially spaced pair of bearing races, each rotationally supporting between the support shaft and the support fitting. The support shaft can include a passage defined axially therethrough for passage of a cross shaft along the wing tilt axis. The support shaft can include a gearbox mount configured to be mounted to a gearbox wherein the gearbox mount and gearbox are stationary relative to the one another. The support fitting can include at least one of a gear mesh or kinematic mechanism configured to connect to an actuator for actuation of the support fitting about the wing tilt axis.

A tiltwing aircraft includes a fuselage, an engine mounted stationary relative to the fuselage, and an opposed pair of wings. The wings are separated from each other with the fuselage therebetween, each wing independently mounted to the fuselage by a respective pivot system for rotation relative to the fuselage. An opposed pair of rotor assemblies is included, each operatively connected to a respective one of the wings for common rotation with the respective wing back and forth between a first position predominantly for lift to a second position predominantly for thrust.

Each respective pivot system can be a pivot system as described above, wherein the support shaft is mounted stationary with respect to the fuselage and each wing is mounted to a respective support fitting for rotation about the respective wing tilt axis. A second engine can be mounted stationary relative to the fuselage, wherein each engine is operatively connected to a respective gearbox, and wherein the support shaft of each pivot system includes a gearbox mount mounted to a respective one of the gearboxes wherein the gearbox mount and gearbox are stationary relative to the fuselage. A respective engine input shaft can connect each engine to a respective gear box, wherein a respective cross shaft connects each respective gear box to a respective one of the rotor assemblies, wherein the cross-shaft passes along the wing tilt axis through a passage defined axially through the support shaft.

The support fitting of each pivot system can be mounted to at least one spar of the respective wing, and/or to at least one rib of the respective wing. The support fitting can be mounted to a pair of ribs and to a pair or spars of the respective wing. A wing tilt actuator can operatively connect the fuselage to each pivot system for rotation of the wings about the wing tilt axes. Each support fitting can include at least one of a gear mesh or a mechanical linkage connected to the actuator for actuation of the support fitting about the wing tilt axis. At least one of the wings can be operatively connected to an actuator including a kinematic mechanism linking between fuselage and the wing for actuating tiltwing motion of wing relative to fuselage. For each wing, a respective control line can run between the support shaft and a cross shaft that passes along the wing tilt axis through a passage defined axially through the support shaft, wherein the cross shaft is connected to drive the respective rotor assembly, and wherein the control line is connected for collective and/or cyclic control of the rotor assembly.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
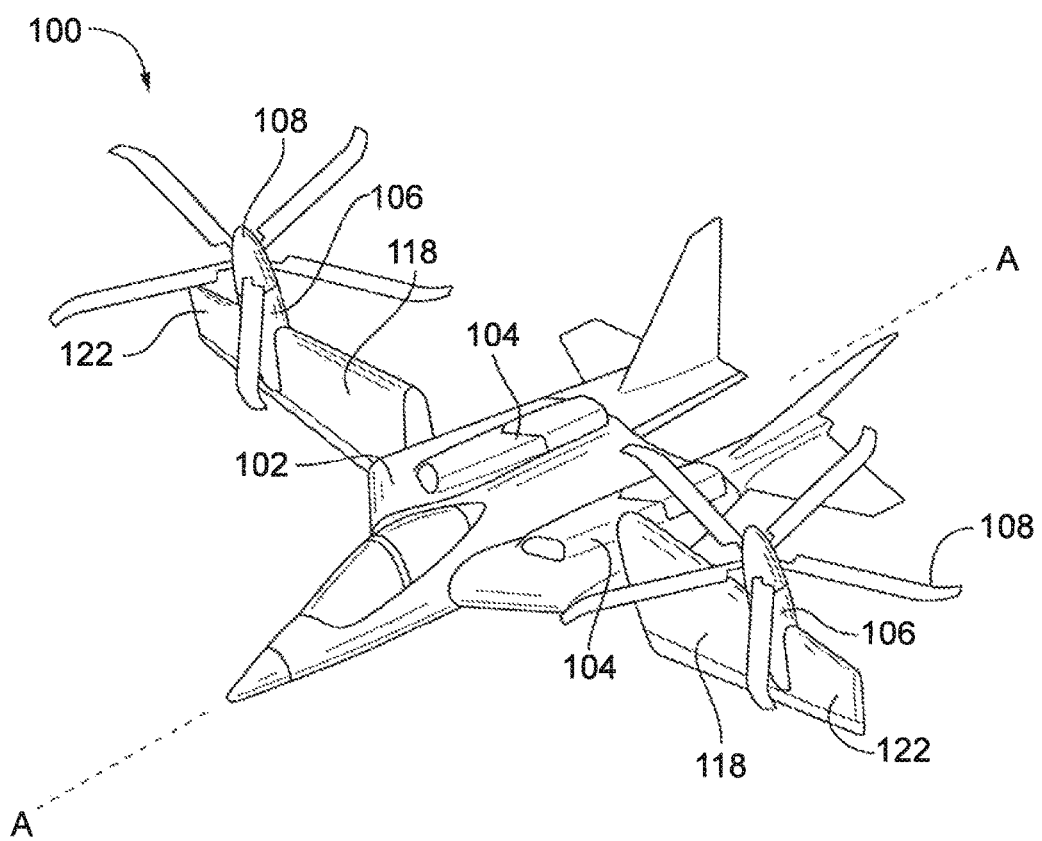
FIG. 1 is a perspective view of an exemplary embodiment of an aircraft constructed in accordance with the present disclosure, showing the tilt wings in vertical and/or short take-off and landing (V/STOL) mode.

Reference will now be made to the drawings wherein like reference numerals identify similar structural features or aspects of the subject disclosure. For purposes of explanation and illustration, and not limitation, a partial view of an exemplary embodiment of an aircraft in accordance with the disclosure is shown in FIG. 1 and is designated generally by reference character 100. Other embodiments of an aircraft in accordance with the disclosure, or aspects thereof, are provided in FIGS. 2-7, as will be described. The systems and methods described herein can be used for vertical and/or short take-off and landing (V/STOL) aircraft.

Figure 2:
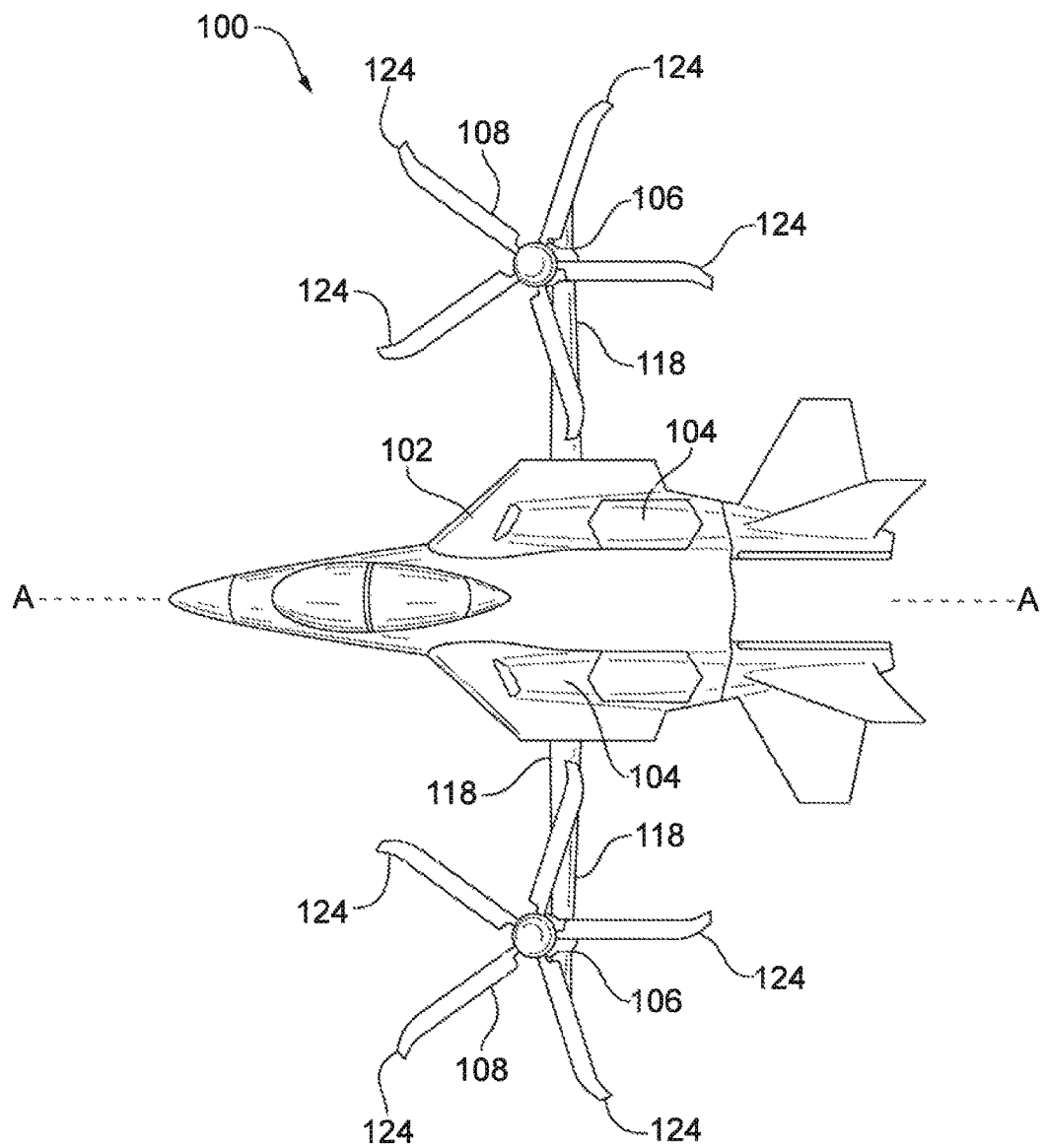
FIG. 2 is a plan view of the aircraft of FIG. 1, showing the rotor assemblies.
Figure 3:
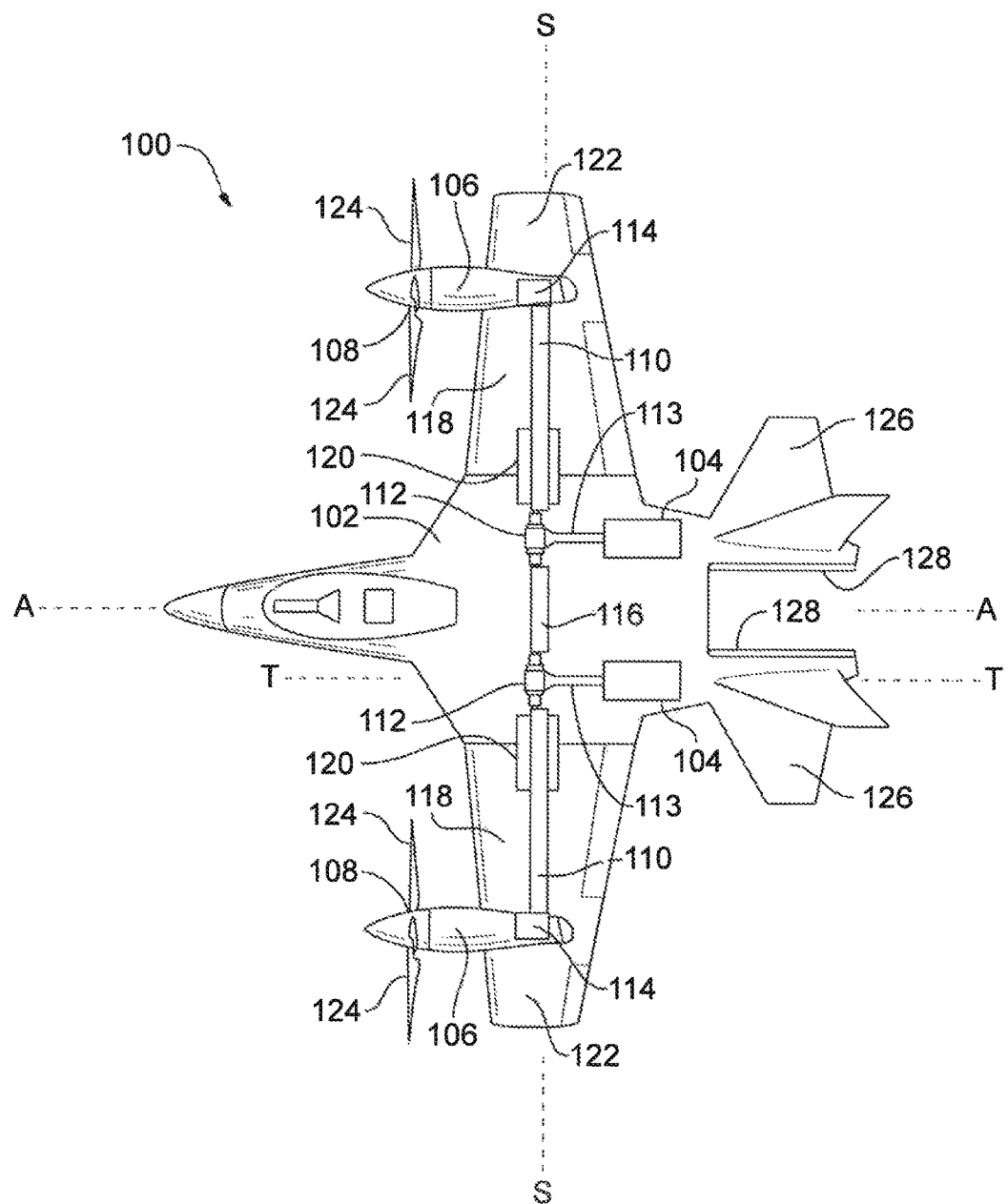
FIG. 3 is a partially schematic plan view of the aircraft of FIG. 1 in forward flight mode, schematically showing the power transmission connecting the engines to the rotor assemblies, and showing the pivot assemblies connecting the wings to the fuselage.

Aircraft 100 includes a fuselage 102 defining an aircraft attitude axis A. Fuselage 102 houses a pair of engines 104 that are fixed relative to the aircraft attitude axis A. A pair of rotor assemblies 106 opposed to one another across fuselage 102 is included, each operatively connected to rotate back and forth relative to the aircraft attitude axis A from a first position predominately for lift or V/STOL mode as shown in FIGS. 1 and 2, to a second position predominately for thrust or forward flight mode as shown in FIG. 3.

Rotor assemblies 106 each include a rotor 108 that is operatively connected to be driven by the respective engine 104. A respective cross shaft 110 operatively connects each rotor 108 to a respective engine 104 for driving the respective rotor 108. Each cross shaft 110 is operatively connected to a respective engine 104 by way of a respective gearbox 112 that receives rotational power from the respective engine 104 through engine input shaft 113 along a transmission axis T substantially parallel with the aircraft attitude axis A and outputs rotational power to the respective cross shaft 110 along a wing tilt axis S substantially perpendicular to the aircraft attitude axis A. A transmission 114 is included in each rotor assembly 106 to transmit rotational power from the respective cross shaft 110 to the respective rotor 108. Gearboxes 112 are connected to each other by a third cross shaft 116 for single engine operation of both of the rotor assemblies 106. Single engine operation can be advantageous in various applications, including fuel economy cruising, endurance, and for redundancy in the event one engine needs to be powered down.

Aircraft 100 is a tiltwing aircraft. An opposed pair of wings 118 are included, separated from each other with the fuselage 102 therebetween. Each wing 118 is independently mounted to fuselage 102 by a respective pivot system 120 for rotation relative to fuselage 102 and aircraft attitude axis A. An opposed pair of rotor assemblies 106 is included, each operatively connected to a respective one of the wings 118 for common rotation with the respective wing 118 back and forth between a first position predominantly for lift to a second position predominantly for thrust.

A pivot system 120 connects each wing 118 to fuselage 102, wherein the pivot system 120 is generally concentric with the respective cross shaft 110 of the respective rotor assembly 106. Each of the respective cross shafts 110 passes through the respective pivot system 120. A wing tip 122 is mounted to each rotor assembly 106 opposite fuselage 102, wherein the wing tip 122 is mounted to the respective rotor assembly 106 for rotation in common therewith relative to the fuselage 102. Each rotor assembly 106 includes a plurality of rotor blades 124 articulated for full cyclic and collective rotor control. Empennage 126 extends aft from fuselage 102, wherein each engine 104 is operatively connected to issue engine exhaust through an exhaust system 128 in the empennage 126 such that the empennage 126 shields exhaust system 128 from line of sight exterior of aircraft 100.

Figure 4:
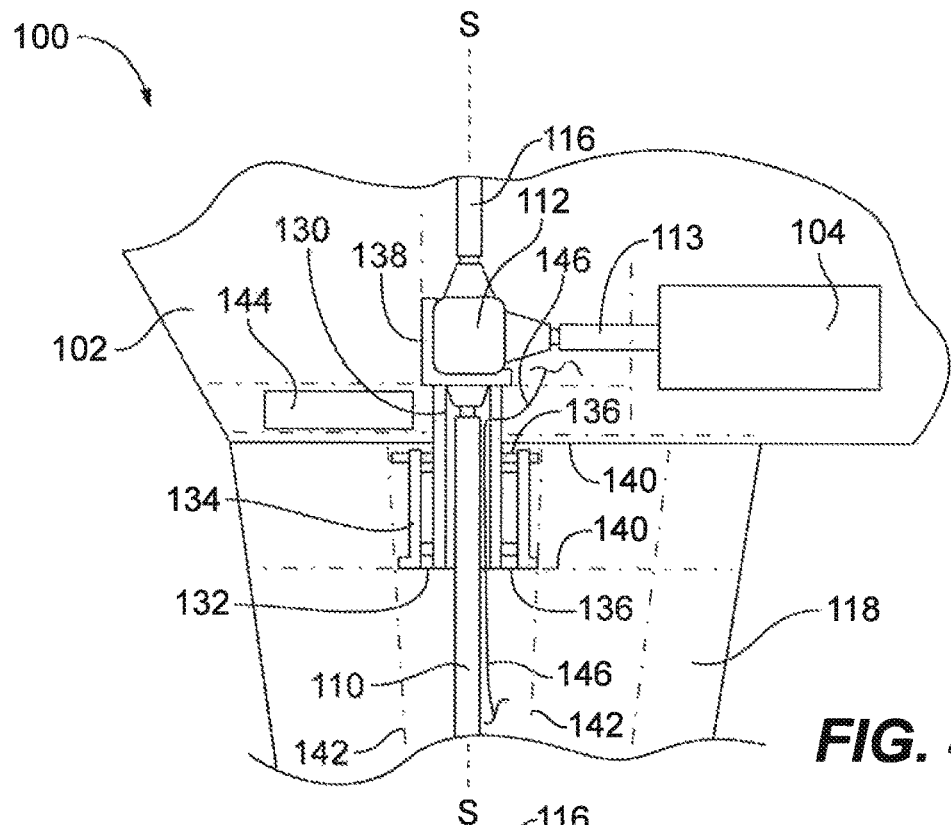
FIG. 4 is a schematic plan view of a portion of the aircraft of FIG. 1, showing one of the pivot assemblies with the wing in forward flight mode.
Figure 5:
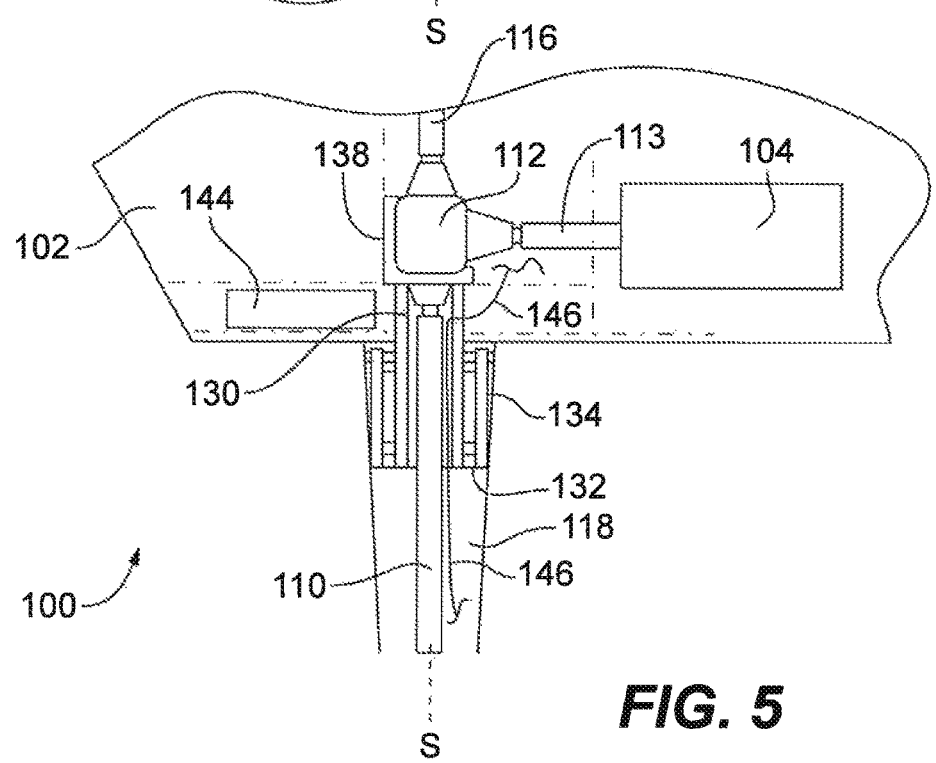
FIG. 5 is a schematic plan view of a portion of the aircraft of FIG. 1, showing one of the pivot assemblies with the wing in V/STOL mode.

Referring now to FIGS. 4 and 5, one of the wings 118 is shown in the forward flight and V/STOL positions, respectively. Pivot system 120 includes a support shaft 130 defining the wing tilt axis S. A bearing 132 is mounted to support shaft 130 outboard of support shaft 130 about the wing tilt axis S. A support fitting 134 is mounted to bearing 132 radially outboard of support shaft 130 for rotation relative to support shaft 130 about the wing tilt axis S. Bearing 132 includes an axially spaced pair of bearing races 136, each rotationally supporting between support shaft 130 and support fitting 134.

Support shaft 130 includes a passage defined axially therethrough along wing tilt axis S, and a cross shaft 110 passes therethrough along the wing tilt axis S. Support shaft 130 includes a gearbox mount 138 mounted to gearbox 112 wherein gearbox mount 138 and gearbox 112 are stationary relative to the one another and to fuselage 102.

Figure 7:
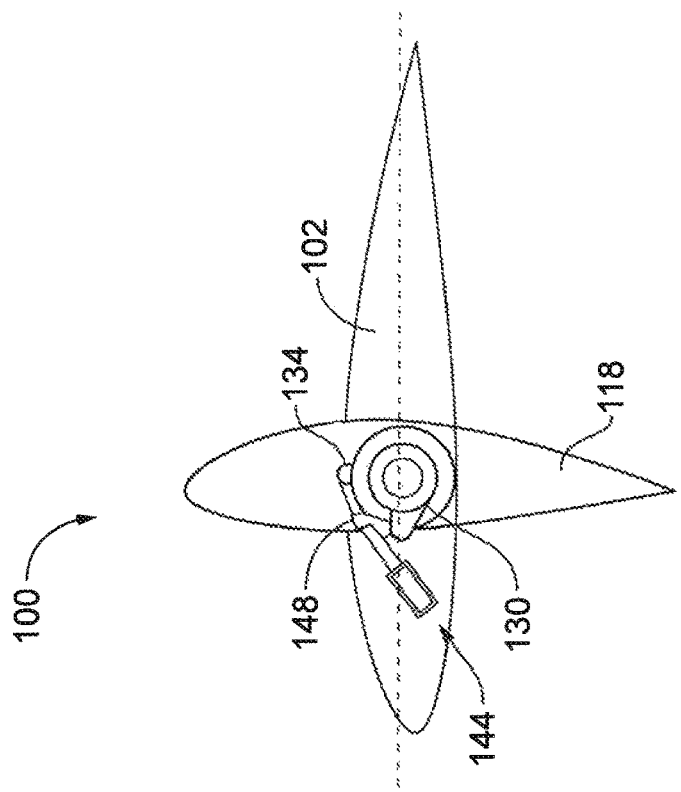
FIG. 7 is a schematic side elevation view of the aircraft of FIG. 1, showing the actuator of FIG. 6 with the wing in V/STOL mode.
Figure 6:
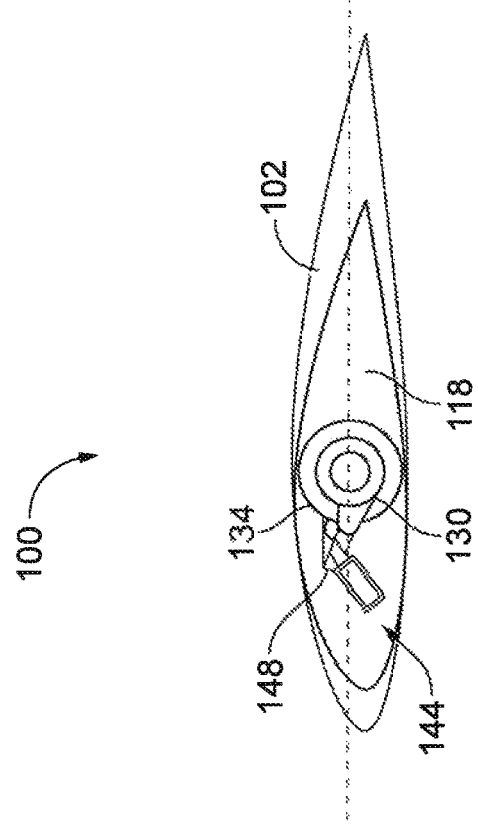
FIG. 6 is a schematic side elevation view of the aircraft of FIG. 1, showing an exemplary embodiment of an actuator for tilt wing actuation, with the wing shown in the forward flight mode.

Each wing 118 is mounted to a respective support fitting 134 for rotation about the respective wing tilt axis S. The support fitting 134 of each pivot system 120 is mounted to a pair of ribs 140 and to a pair or spars 142 of the respective wing 118, i.e. in a compartment of wing 118 defined between two spars 142 and between two ribs 140. A wing tilt actuator 144 operatively connects the fuselage 102 to each pivot system 120 for rotation of the wings about the wing tilt axes S. Each support fitting 134 can include at least one of a gear mesh or kinematic mechanism operatively connected to a linear or rotary actuator 144 that provides force or torque, that facilitates motion between the fuselage 102 and support fitting 134/wing 118 about the wing tilt axis S and structural attachment points on the fuselage 102 for the actuator 144 and mechanism and a structural attachment point on the wing 118. The mechanism is envisioned to be adjacent to the fuselage / wing interface area. The left and right wing actuation mechanisms may be interconnected mechanically or electrically to synchronize motion of the wings. It is contemplated that a single actuator 144 can be used to actuate both wings 118, or that a separate respective actuator 144 can be provided for each wing. This latter case can allow independent actuation of each wing 118. Those skilled in the art will readily appreciate that having the actuator 144 mounted in the fuselage 102 is a non-limiting example. For example, actuators could be provided within the wings 118 and could engage support shaft 130 within each wing for tilt wing actuation. FIGS. 6 and 7 show an exemplary embodiment of an actuator 144 in aircraft 100 in the forward flight mode and V/STOL mode, respectively. In this example, actuator 144 includes a kinematic mechanism 148 linked between support shaft 130 (that is fixed relative to fuselage 102) and support fitting 134 (that is fixed relative to wing 118) for actuating tiltwing motion of wing 118 relative to fuselage 102.

With reference again to FIGS. 4 and 5, for each wing 118, a respective control line 146 runs between each support shaft 130 and a respective cross shaft 110 through a passage defined axially through the support shaft 130. The control line 146 is connected for collective and/or cyclic control of the respective rotor assembly 106, shown in FIGS. 1-3. Those skilled in the art will readily appreciate that control lines 146 can include lines for hydraulics, electrical control, sensors, electrical power, and the like.

Pivot systems 120 bear the loads of wings 118, and the bearings 132 are in the load path of substantially the entire load on each respective wing 118. Those skilled in the art will readily appreciate that bearings 132 can be designed on an application by application basis to develop expected loads.

Since the engines 104 do not have to rotate to change from hover to forward flight, the engines 104 do not have to be specially designed to handle rotation as in conventional tiltwing and tiltrotor aircraft. In conventional tiltwing and tiltrotor aircraft, the engines have to be specially designed to handle rotation to the vertical position, which tends to upset fluid systems such as sumps and the like that are typical in main stream engines. This has traditionally been a design limitation on tiltwing and tiltrotor aircraft—designers were limited to what engine models could be used in such aircraft. With the systems and methods disclosed herein, any suitable engine can be used without necessarily requiring capability of operation in the vertical position.

Those skilled in the art will readily appreciate that while described herein in the exemplary context of having two engines, aircraft can have any suitable number of engines, including single engine configurations, without departing from the scope of this disclosure. Mounting the engine within the fuselage eliminates the need for a wide-engine attitude capability. Engine power can be transmitted to the prop-rotor via gearboxes and cross shafts. The engine, inlet, and exhaust system to not need to articulate, offering design and operational benefits. For example, the engine exhaust system can be designed for a more stringent level of survivability requirements. A level body attitude allows the fuselage to contain personnel and crew.

The methods and systems of the present disclosure, as described above and shown in the drawings, provide for tiltwing aircraft with superior properties including maintaining of the engines in a substantially horizontal aspect regardless of the rotor assembly aspect. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pivot system for a tiltwing aircraft comprising:
   a gearbox;
   a support shaft defining a wing tilt axis and comprising a gearbox mount mounted to the gearbox, the gearbox mount and gearbox being stationary relative to one another;
   a bearing mounted to the support shaft radially outward of the support shaft about the wing tilt axis; and
   a support fitting mounted to the bearing radially outward of the support shaft for rotation relative to the support shaft about the wing tilt axis, the support fitting attached to a wing for rotation relative to the support shaft.

2. A pivot system as recited in claim 1, wherein the bearing includes an axially spaced pair of bearing races, each arranged between the support shaft and the support fitting.

3. A pivot system as recited in claim 1, wherein the support shaft includes a passage defined axially therethrough for passage of a cross shaft along the wing tilt axis.

4. A pivot system as recited in claim 1, wherein the support fitting includes at least one of a gear mesh or kinematic mechanism configured to connect to an actuator for actuation of the support fitting about the wing tilt axis.

* * * * *